C. SOKOLOWSKI.
TORPEDO GUARD FOR VESSELS.
APPLICATION FILED JUNE 21, 1917.

1,249,844.

Patented Dec. 11, 1917.

Inventor
Charles Sokolowski,
By his Attorney
Geo. A. Byrne.

UNITED STATES PATENT OFFICE.

CHARLES SOKOLOWSKI, OF ELIZABETH, NEW JERSEY.

TORPEDO-GUARD FOR VESSELS.

1,249,844.  Specification of Letters Patent.  Patented Dec. 11, 1917.

Application filed June 21, 1917.  Serial No. 176,250.

*To all whom it may concern:*

Be it known that I, CHARLES SOKOLOWSKI, a citizen of the Republic of Russia, and resident of Elizabeth, in the county of Union and State of New Jersey, have invented certain new and useful Improvements in Torpedo-Guards for Vessels, of which the following is a specification.

The present invention relates to certain new and useful improvements in means for protecting vessels at sea from attack by automobile torpedoes, and has for its general object the provision of a torpedo guard adapted for effecting the explosion of a torpedo on coming in contact with the guard at a safe distance outboard from the vessel.

Other objects will appear and be better understood from that embodiment of my invention of which the following is a specification, reference being had to the accompanying drawings forming part hereof, and in which—

Figure 1:
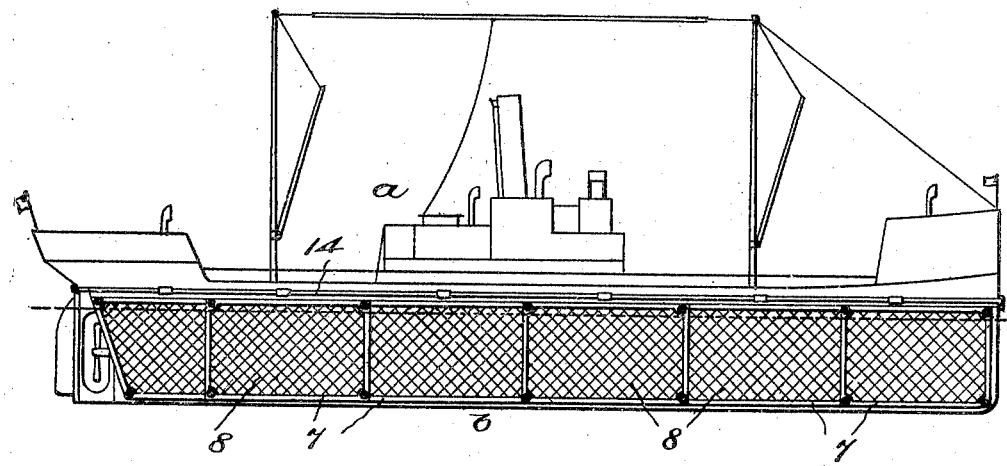
Figure 1 is a side elevational view of a vessel, showing my invention applied thereto.

In the drawings "*a*" designates a vessel of ordinary construction, and "*b*" designates my improved guard or shield preferably constructed to protect the hull from torpedo attack. In the present instance, I have shown the guard constructed in the form of submerged nets which extend outboard from the opposite sides of the vessel's hull. The guards are yieldingly held in spaced relation to the sides of the vessel by being mounted on the outer end of a plurality of booms or arms 5 which project outwardly from the vessel's sides and are disposed substantially at the keel and water line thereof. These arms are secured to the sides of the vessel in any suitable manner, as, for instance, by having their inner or flanged ends 6 bolted to the vessel's sides, as shown.

Figure 2:
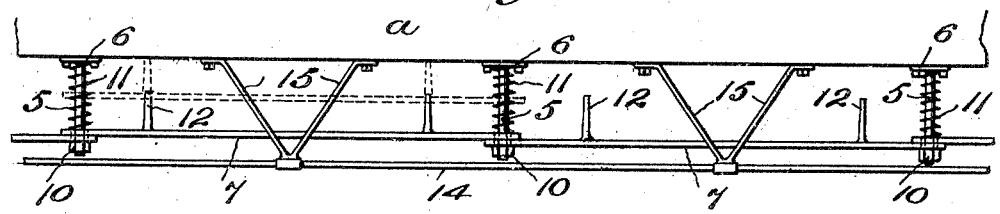
Fig. 2 is a top plan view of a portion of one side of a vessel showing the guard connected thereto.
Figure 3:
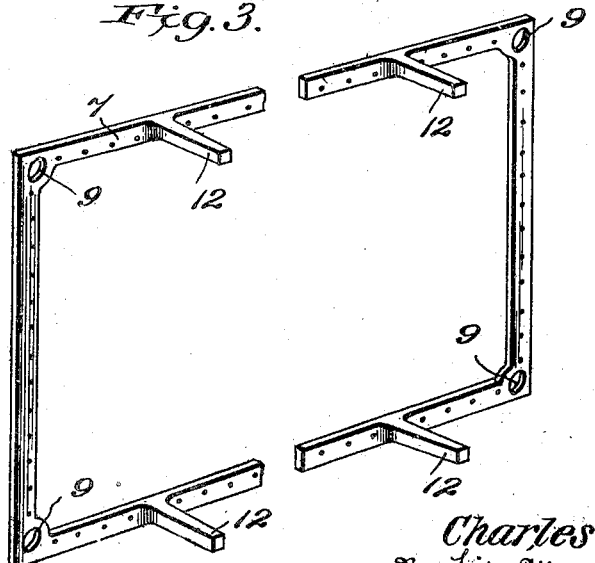
Fig. 3 is a detail perspective view of one of the frame sections of which the guard is formed.
Figure 4:
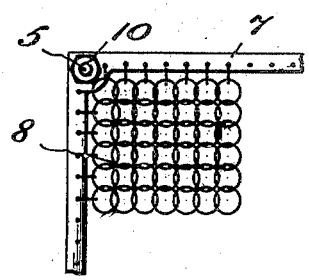
Fig. 4 is a fragmentary view of one of the frame sections, showing a portion of a form of wire netting connected thereto.

The guards extend substantially the full length of the vessel's sides and comprise a plurality of frame sections 7, each of which is provided with a wire netting 8 formed of any suitable mesh adapted for the purpose. It is thought that the form of netting shown in Fig. 4 could be admirably adapted for guards of this kind because its flexibility could be materially utilized in arresting the speed of the torpedo when it strikes the net. The frame sections are each perforated, as at 9, so that they may be slidably mounted on the arms 5, and to secure the sections on the arms and to limit their outward movement it will be noted that the ends of the arms are provided with nuts 10, against which the frame sections abut. As shown in Fig. 2, the frame sections are mounted on the arms 5, so that the sections overlap. Coil springs 11 are mounted on the arms 5, and these springs have their ends engaging the flanged portions of the arms and the inner faces of the frame sections for yieldingly holding the frame sections in spaced relation to the sides of the hull and against the nuts 10 on the ends of the arms. It is obvious that by forming the net of a plurality of frame sections, should any one of the sections become damaged it may be readily removed and replaced by unscrewing the nuts 10 on the ends of the arms 5. To limit the inward movement of the frame sections, each of the sections is provided with a plurality of projections 12. These projections are provided on the inner face of the frame sections and are arranged so that their ends contact with the side of the hull when the frame sections have been depressed by an automobile torpedo striking the net.

Should the torpedo explode when it has been engaged by the net, it is obvious that it will explode at such a distance from the hull of the vessel that it would not do the serious damage that would occur if the torpedo exploded directly against the side of the vessel; it being well known that explosions in the water at a short distance from the vessel cause very little, if any, injury to the vessel.

To prevent injury to the shield or nets when the vessel is being loaded or unloaded from barges or the like, a guard rail 14 is provided. This rail extends longitudinally of the ship and projects outboard therefrom a slight distance beyond the torpedo guard as shown in Fig. 2. The rail is secured to the hull by means of a plurality of braces 15, which are bolted to the vessel's sides and disposed above the water line, as clearly shown in Fig. 1.

It will be obvious that various modifications might be made in the apparatus described herein, and in the construction and arrangement of parts, without departing from the spirit of my invention.

Having thus described my invention, what I claim and desire to secure by Letters Patent of the United States is—

1. A torpedo guard for vessels, comprising a plurality of arms connected to the outer surface of the vessel's sides and extending outwardly therefrom, a net comprising a plurality of overlapping sections slidably mounted on said arms, springs mounted on the arms and engaging the overlapping portions of said sections and means mounted on the inner face of said sections and arranged for limiting the inward movement of said sections substantially as described.

2. A torpedo guard for vessels, comprising a plurality of arms connected to the outer surface of the vessel's sides and extending outwardly therefrom, a plurality of overlapping frame sections slidably mounted on said arms, nets mounted on said frame sections and springs mounted on said arms, and engaging the overlapping portions of said sections for yieldingly resisting the inward movement of said sections, substantially as described.

3. A torpedo guard for vessels, comprising a plurality of arms connected to the outer surface of the vessel's sides and extending outwardly therefrom, a plurality of frame sections slidably mounted on said arms, nets mounted on said frame sections, springs mounted on said arms and engaging the said sections for yieldingly resisting the inward movement of said sections and a plurality of projections mounted on the inner face of said frame sections and arranged for limiting the inner movement of said sections when depressed, substantially as described.

Signed at New York in the county of New York and State of New York this 15th day of June A. D. 1917.

CHARLES SOKOLOWSKI.

Copies of this patent may be obtained for five cents each, by addressing the "Commissioner of Patents, Washington, D. C."